United States Patent
Bradley et al.

(10) Patent No.: US 6,813,563 B1
(45) Date of Patent: Nov. 2, 2004

(54) ATMOSPHERIC DATA MEASUREMENT SYSTEM

(75) Inventors: William E. Bradley, Broomfield, CO (US); Ryan W-M. Schnell, Boulder, CO (US); Pierre-Louis Prevost, Souffelweyersheim (FR); James P. Greenberg, Boulder, CO (US); Alex B. Guenther, Boulder, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 10/408,945

(22) Filed: Apr. 8, 2003

(51) Int. Cl.[7] .......................................... G06F 169/00
(52) U.S. Cl. ......................................................... 702/3
(58) Field of Search ................................ 702/2, 3, 4, 5

(56) References Cited

U.S. PATENT DOCUMENTS

| | | | |
|---|---|---|---|
| 5,533,694 A | | 7/1996 | Carpenter |
| 5,646,343 A | | 7/1997 | Pritchard |
| 6,023,223 A | * | 2/2000 | Baxter, Jr. ............... 340/531 |
| 6,400,996 B1 | | 6/2002 | Hoffberg et al. |
| 6,405,135 B1 | * | 6/2002 | Adriany et al. ............ 702/5 |
| 6,422,506 B1 | | 7/2002 | Colby |
| 6,429,812 B1 | | 8/2002 | Hoffberg |
| 6,438,577 B1 | | 8/2002 | Owens |
| 6,505,123 B1 | * | 1/2003 | Root et al. ................. 702/3 |
| 2002/0008625 A1 | * | 1/2002 | Adams et al. .......... 340/573.1 |
| 2002/0032875 A1 | * | 3/2002 | Kashani ................... 713/300 |
| 2002/0095587 A1 | * | 7/2002 | Doyle et al. ............. 713/186 |
| 2002/0173704 A1 | * | 11/2002 | Schulze et al. ........... 600/300 |
| 2003/0095155 A1 | * | 5/2003 | Johnson ................... 345/864 |
| 2003/0206100 A1 | * | 11/2003 | Richman et al. ......... 340/506 |
| 2003/0208113 A1 | * | 11/2003 | Mault et al. .............. 600/316 |

* cited by examiner

*Primary Examiner*—Donald McElheny, Jr.
(74) *Attorney, Agent, or Firm*—Duft Setter Ollila & Bornsen LLC

(57) ABSTRACT

An atmospheric data measurement system comprises an atmospheric sensor, personal digital assistant, link, power system, and enclosure. The atmospheric sensor measures an atmospheric parameter and generates data indicating the atmospheric parameter. The link transfers the data from the atmospheric sensor to the personal digital assistant. The personal digital assistant receives, stores, and transfers the data. The power system provides power to the atmospheric sensor and the personal digital assistant. The enclosure houses the atmospheric sensor, the personal digital assistant, the link, and the power system.

41 Claims, 4 Drawing Sheets

ATMOSPHERIC DATA MEASUREMENT SYSTEM

GOVERNMENT FUNDED INVENTION

This invention was made with Government support under Agreement number ATM-9723665 awarded by the National Science Foundation. The Government has certain rights in this invention.

BACKGROUND OF THE INVENTION

1. Field of the Invention

The invention is related to the field of atmospheric measurement, and in particular, to a system that receives, stores, and transfers data indicating an atmospheric parameter

2. Statement of the Problem

Data loggers collect and store data for subsequent analysis. Some examples of this data include temperature, light intensity, and on/off status. The typical data logger is battery powered and includes a sensor, microprocessor, memory, and computer interface. The sensor measures some parameter and generates a signal indicating the measurement. Data is derived from the signal, and the microprocessor stores the data in the memory. The microprocessor may time stamp the data. Subsequently, the data is transferred from the memory to a computer through the computer interface. The computer then analyzes the data.

For atmospheric measurement, data loggers have been used to measure atmospheric parameters, such as temperature, pressure, humidity, wind, and solar radiation. Tethered balloons are used to transport data loggers to altitudes where measurements are taken. The tethered balloon is subsequently lowered, the data logger is removed, and the data is transferred to a computer for analysis.

Unfortunately, these data loggers may require too much power or may not be rugged enough for lengthy field service. The data loggers may also be too heavy and cumbersome for effective use with a tethered balloon. In addition, current data loggers can be complex to operate and may require too much engineering for some users. Current data loggers may not be off-the-shelf components, and thus, they would need to be configured to interoperate with other system components.

SUMMARY OF THE SOLUTION

The invention helps solve the above problems with an atmospheric data measurement system. The atmospheric data measurement system may be lighter and more compact than comparable data loggers. The atmospheric data measurement system may use battery power more efficiently than comparable data loggers. Also, the atmospheric data measurement system may be easier to program and use than comparable data loggers. Examples of the invention include atmospheric data measurement systems, methods of atmospheric data measurement system operation, and software products for atmospheric data measurement systems.

Some examples of the invent ion include an atmospheric data measurement system that comprises: an atmospheric sensor, a personal digital assistant, a link, a power system, and an enclosure. The atmospheric sensor is configured to measure an atmospheric parameter and generate data indicating the atmospheric parameter. The link is configured to transfer the data from the atmospheric sensor to the personal digital assistant. The personal digital assistant is configured to receive, store, and transfer the data. The power system is configured to provide power to the atmospheric sensor and the personal digital assistant. The enclosure is configured to house the atmospheric sensor, the personal digital assistant, the link, and the power system.

Some examples of the invention include a method of operating an atmospheric data measurement system. The method comprises: housing an atmospheric sensor and a personal digital assistant in an enclosure; transporting the enclosure to an altitude; in the atmospheric sensor that is in the enclosure at the altitude, measuring an atmospheric parameter and generating data indicating the atmospheric parameter; in the personal digital assistant that is in the enclosure at the altitude, receiving and storing the data; and transferring the data from the personal digital assistant.

Some examples of the invention include a software product for an atmospheric data measurement system. The atmospheric data measurement system includes a personal digital assistant and an atmospheric sensor to measure an atmospheric parameter and generate data indicating the atmospheric parameter. The software product comprises application software and a memory that stores the application software. The application software directs the personal digital assistant to receive the data indicating the atmospheric parameter, store the data, transfer the data, and control operation of the atmospheric sensor.

Some examples of the invention include an atmospheric data measurement system that comprises: a control system, a power system, and an enclosure. The control system is configured for removable coupling to any of a plurality of different atmospheric sensors. The control system is configured to receive data indicating an atmospheric parameter from a coupled one of the atmospheric sensors, store the data, and transfer the data. The power system is configured to provide power to the coupled one of the atmospheric sensors and the control system. The enclosure is configured to house the coupled one of the atmospheric sensors, the control system, and the power system.

In some examples of the invention, a tethered balloon transports the enclosure to an altitude.

In some examples of the invention, the atmospheric parameter comprises one of carbon dioxide, carbon monoxide, hydrocarbons, water vapor, ozone, nitrous oxide, and methane.

In some examples of the invention, the atmospheric parameter comprises one of temperature, pressure, humidity, wind, and solar radiation.

In some examples of the invention, the personal digital assistant is configured to control operation of the atmospheric sensor.

In some examples of the invention, the personal digital assistant is configured to correlate the data for individual atmospheric samples with individual times of measurement of the individual atmospheric samples.

In some examples of the invention, the personal digital assistant is configured to correlate the data for individual atmospheric samples with individual geographic locations of measurement of the individual atmospheric samples.

In some examples of the invention, the personal digital assistant is configured to transfer the data using wireless communications when the enclosure is being transported.

In some examples of the invention, the enclosure is transported to various altitudes and the personal digital assistant is configured to control the altitudes using wireless communications.

In some examples of the invention, the atmospheric data measurement system further comprises a pump. The pump is configured to transfer atmospheric air to the atmospheric sensor. The power system is configured to provide power to the pump. The enclosure is configured to house the pump. In some examples of the invention, the personal digital assistant is configured to control operation of the pump.

In some examples of the invention, the enclosure is configured to allow a display on the personal digital assistant to be visible when the personal digital assistant is in the enclosure.

In some examples of the invention, the control system is configured to control operation of the atmospheric sensor.

In some examples of the invention, the control system is configured to correlate the data for individual atmospheric samples with individual times of measurement of the individual atmospheric samples.

In some examples of the invention, the control system is configured to correlate the data for individual atmospheric samples with individual geographic locations of measurement of the individual atmospheric samples.

In some examples of the invention, the control system is configured to transfer the data using wireless communications when the enclosure is being transported.

In some examples of the invention, the enclosure is transported to various altitudes and the control system is configured to control the altitudes using wireless communications.

In some examples of the invention, the control system comprises a personal digital assistant.

DETAILED DESCRIPTION OF THE INVENTION

FIGS. 1–4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE #1

Figure 1:
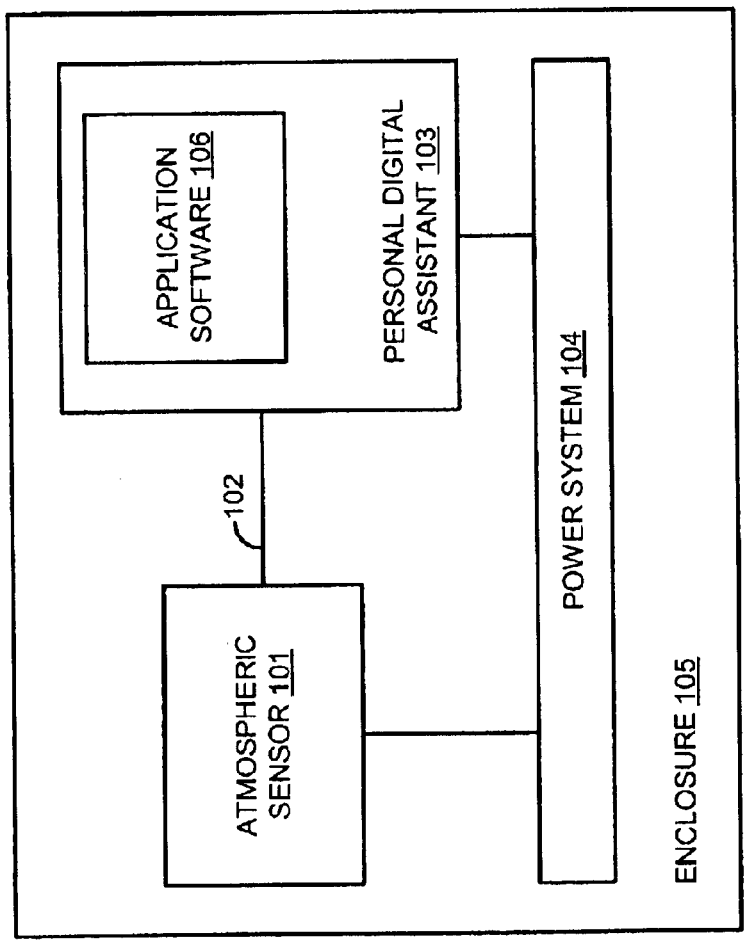
FIG. 1 illustrates an atmospheric data measurement system in an example of the invention.

FIG. 1 illustrates atmospheric data measurement system 100 in an example of the invention. Atmospheric data measurement system 100 comprises: atmospheric sensor 101, link 102, personal digital assistant 103, power system 104, and enclosure 105. If desired, atmospheric data measurement system 100 can be attached to a tethered balloon that transports system 100 to an altitude where atmospheric sensor 101 measures an atmospheric parameter, and personal digital assistant 103 stores the resulting data. Various atmospheric measurements may be taken at different altitudes.

Atmospheric sensor 101 measures at least one atmospheric parameter and generates data that indicates the atmospheric parameter. Some examples of atmospheric parameters include carbon dioxide, hydrocarbons, water vapor, ozone, nitrous oxide, methane, temperature, pressure, humidity, wind, and solar radiation.

Link 102 transfers the data indicating the atmospheric parameter from atmospheric sensor 101 to personal digital assistant 103. Link 102 could be an RS-232 connection, universal serial bus, infra-red communicator, wireless communication interface, and/or some other suitable data transfer link.

Power system 104 provides power to atmospheric sensor 101 and personal digital assistant 103. Power system 104 could include batteries in various configurations. In some examples, one battery (or set of batteries) could be externally connected to atmospheric sensor 101, and another battery (or set of batteries) could be internal to personal digital assistant 103. In other examples, a single battery (or set of batteries) could be externally connected to both atmospheric sensor 101 and personal digital assistant 103. Alternatively, power system 104 could include solar cells or some other suitable components for providing power within system 100.

Enclosure 105 houses atmospheric sensor 101, link 102, personal digital assistant 103, and power system 104. Enclosure 105 could be a plastic box with internal restraints to secure internal components 101–104. Enclosure 105 may have ports for battery charging, personal digital assistant data transfer, and atmospheric air ingress/egress. Enclosure 105 may have a clear portion to allow a display on personal digital assistant 103 to be visible from outside of enclosure 105 when personal digital assistant 103 is secured within enclosure 105. Enclosure 105 may be water resistant or waterproof. Enclosure 105 may include attachments to conveniently but securely couple enclosure 105 to a transport mechanism, such as a tethered balloon. Advantageously, enclosure 105 consolidates all components in a single, compact, and rugged container to eliminate excessive cabling and noise, and to eliminate a cumbersome bundle of separate components.

Personal digital assistant 103 is a hand-held end-user device that includes a display and user interface, microprocessor, operating system, memory, and batteries or battery ports. Some examples of personal digital assistant 103 include the Palm m-series, Handspring Visor, HandEra 330, and Sony CLIE. The memory stores application software 106. Under the control of the operating system, the microprocessor retrieves application software 106 from the memory and executes application software 106 to control the operation of personal digital assistant 103. Thus, application software 106 directs personal digital assistant 103 to operate as described herein.

Personal digital assistant 103 receives the data that indicates the atmospheric parameter from link 102. Personal digital assistant 103 stores the data in its memory and may reformat the data prior to storage. One example of reformatting is converting the data from a hexadecimal format to a base ten format. Personal digital assistant 103 subsequently transfers the data. In some variations, personal digital assistant 103 transfers the data to a computer in a conventional manner after system 100 is recovered from the tethered balloon or other transport mechanism. In other variations, personal digital assistant 103 includes a wireless communication interface to transfer the data using wireless communications while system 100 is still attached to the tethered balloon or other transport mechanism. The wireless communication interface could be a wireless telephone, radio, or some other wireless communication apparatus.

Personal digital assistant 103 may control the operation of atmospheric sensor 101. This control could include turning sensor atmospheric sensor 101 on and off, or placing sensor 101 in a standby mode. This control could include starting and stopping data transfer from atmospheric sensor 101. In addition to atmospheric sensor 101, personal digital assistant 103 may control the operation of other components in a similar fashion. These other components could include pumps, wireless telephones, transport mechanisms, and global position satellite systems.

Typically, atmospheric sensor 101 measures the atmospheric parameter in repeated samples and generates the data to individually indicate each sample. Personal digital assistant 103 may correlate the data for an atmospheric sample with the time of measurement for the atmospheric sample. The time correlation could be date/time stamp indicating when personal digital assistant 103 received the data for the individual atmospheric sample. Likewise, personal digital assistant 103 may correlate the data for an atmospheric sample with the geographic location of measurement for the atmospheric sample. In some variations, the geographic location could be altitude. In some variations, the geographic location could be global position satellite coordinates for system 100 that are correlated in time with the time of measurement for the atmospheric sample. For example, a global position satellite location system could be integrated within personal digital assistant 103 or could be externally provided within system 100. Personal digital assistant 103 could then time stamp the geographic coordinates when they are generated or received, and then match the time stamps for the data and the geographic coordinates to correlate the atmospheric sample with a geographic location.

Personal digital assistant 103 may control the altitude of system 100. This control could include using wireless communications to transfer instructions to a ground system that controls the altitude of the tethered balloon. For example, personal digital assistant 103 may be programmed to search for a particular concentration of ozone, and as a result, may transfer instructions to change the altitude until data indicating the target ozone concentration is received from atmospheric sensor 101.

In operation, the user places atmospheric sensor 101 and personal digital assistant 103 in enclosure 105 and couples atmospheric sensor 101 to personal digital assistant 103 with link 102. Power system 104 is set-up in enclosure 105 to provide power. Personal digital assistant is turned on and application software 106 is launched. Other system 100 components may be turned on at this time, or personal digital assistant 103 may subsequently turn them on at a given altitude or after a given time delay. When ground set-up is complete, enclosure 105 is then transported to an altitude—possibly by raising a tethered balloon with a winch. At altitude, atmospheric sensor 101 measures an atmospheric parameter and generates data indicating the atmospheric parameter. Link 102 transfers the data to personal digital assistant 103. At altitude, personal digital assistant 103 receives and stores the data. Personal digital assistant 103 transfers the data—either at altitude through a wireless communication interface or on the ground in a conventional manner.

Advantageously, personal digital assistant 103 may be easier to program than comparable data loggers. Personal digital assistant 103 may have a larger display than comparable data loggers. Personal digital assistant 103 may use battery power more efficiently than comparable data loggers. In addition, personal digital assistant 103 may be easier to operate than comparable data loggers when transferring data to an external computer.

EXAMPLE #2

Figure 2:
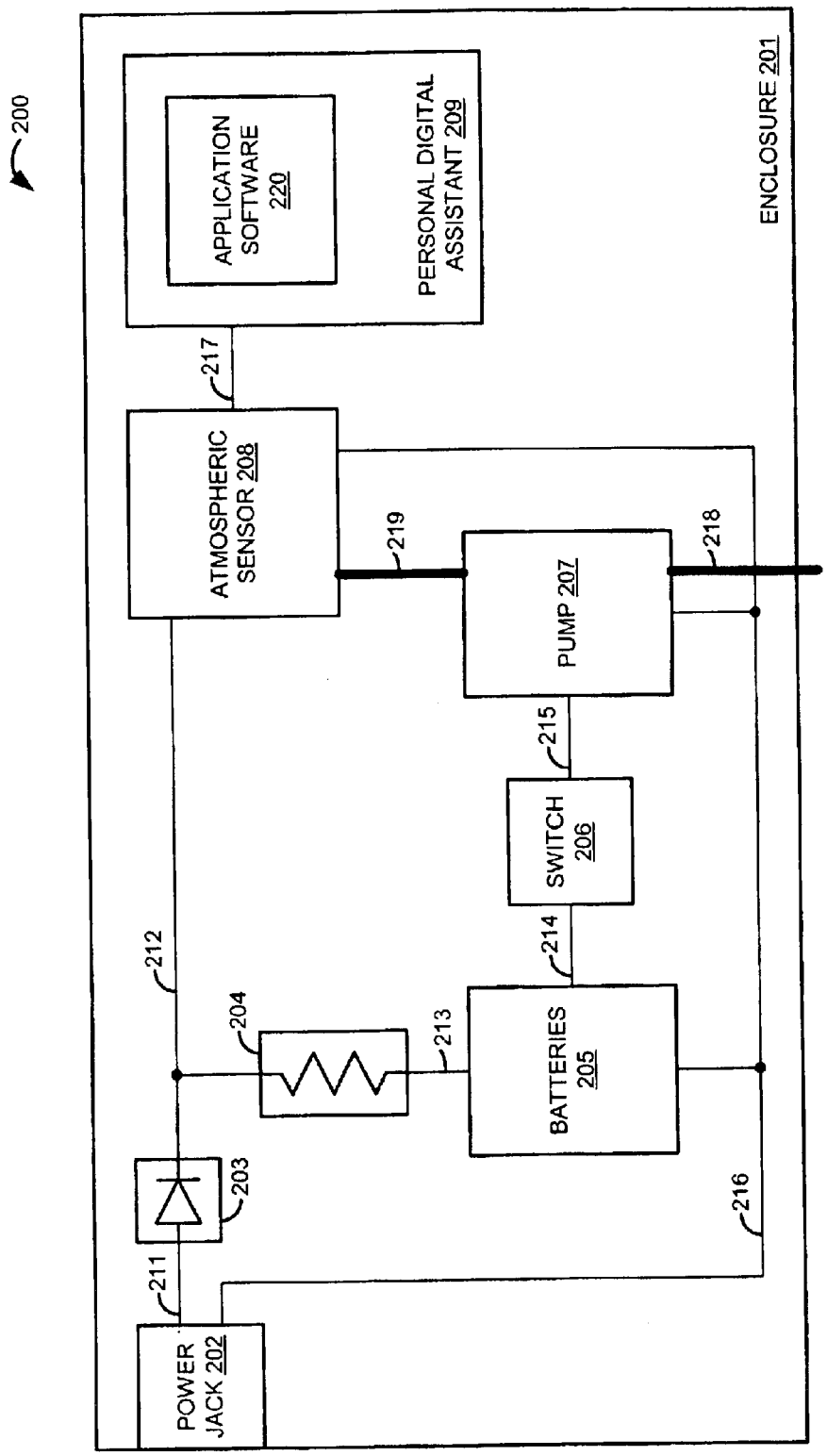
FIG. 2 illustrates an atmospheric data measurement system in an example of the invention.

FIG. 2 illustrates atmospheric data measurement system 200 in an example of the invention. Atmospheric data measurement system 200 includes enclosure 201 that houses the following components and connections. Powerjack 202 is accessible through enclosure 201 and has a 15 volt terminal coupled to connection 211 and a 0 volt terminal coupled to connection 216. The input of diode 203 is coupled to connection 211, and the output of diode 203 is coupled to connection 212. Resistor 204 is rated at 2.5 ohms and 10 watts and is coupled to connection 212 on the high side and to connection 213 on the low side. Batteries 205 are ten 1.2 volt nickel cadmium batteries with a 12 volt tap coupled to connection 213, a 6 volt tap coupled to connection 214, and a 0 volt tap coupled to connection 216. Switch 207 is an on/off switch that is coupled between connections 214–215. Pump 207 has a 6 volt terminal coupled to connection 215 and a 0 volt terminal connected to connection 216. Pump 207 has an air intake coupled to tube 218 that extends through enclosure 201 and an air output coupled to tube 219. Atmospheric sensor 208 has a high terminal coupled to connection 212 and a low terminal connected to connection 216. Atmospheric sensor 208 has an air intake coupled to tube 219. Atmospheric sensor 208 has a data output that is coupled to RS-232 link 217. Personal digital assistant 209 has a data input coupled to RS-232 link 217. Personal digital assistant 209 is powered by its own internal batteries and includes application software 220. The following table illustrates sample products for some of these components.

| Component | Supplier | Model |
| --- | --- | --- |
| Batteries 205 | Sanyo | Cadnica Cell Type KR-1100AU |
| Pump 207 | KNF Neuberger | Type NMP08 Micro-Diaphragm Pump |
| Atmospheric Sensor 208 | RMT Ltd. | Gas Analyzer DX6100 |
| Personal Digital Assistant 209 | Handspring | Visor Deluxe |

In operation, batteries 205 are charged through powerjack 202 by an AC/DC 120 volt/15 volt power supply that is plugged into a 120 volt power outlet. Enclosure is prepared for transport by a tethered balloon. Switch 206 is set to on to activate pump 207. Atmospheric sensor 208 is activated. Personal digital assistant 209 is activated and application software 220 for the atmospheric data measurement system is launched. A winch is then operated to raise the tethered balloon. Pump 207 transfers atmospheric air to atmospheric sensor 208. Atmospheric sensor 208 processes the air to measure an atmospheric parameter. Atmospheric sensor 208 generates a digital data signal indicating the atmospheric parameter and transfers the digital signal to personal digital assistant 209 over RS-232 link 217.

Application software 220 in personal digital assistant 209 controls system operation. Application software 220 manages buffer fill by inhibiting atmospheric sensor 208 to prevent buffer overflow. Application software 220 operates in following sequence in some variations where a database has been created and the port is open: 1) receive/read data, 2) convert data to decimal bytes, 3) decrement byte count, 4) display and time stamp data, 5) create record and write data to database. Application software 220 includes the following commands in some variations: start application, open port, close port, send data, receive data, clear data, display data, convert data to decimal, convert data to hex, put data in byte array, create database for date and time, write data to database, and close database.

The tethered balloon is eventually lowered and personal digital assistant 209 is removed from enclosure 201. Personal digital assistant 209 is operated to transfer the data from the application database to an external computer or memory. Based on the power remaining in the batteries 205 and personal digital assistant 209, system 200 could be reused to collect more data indicating atmospheric parameters.

EXAMPLE #3

Figure 3:
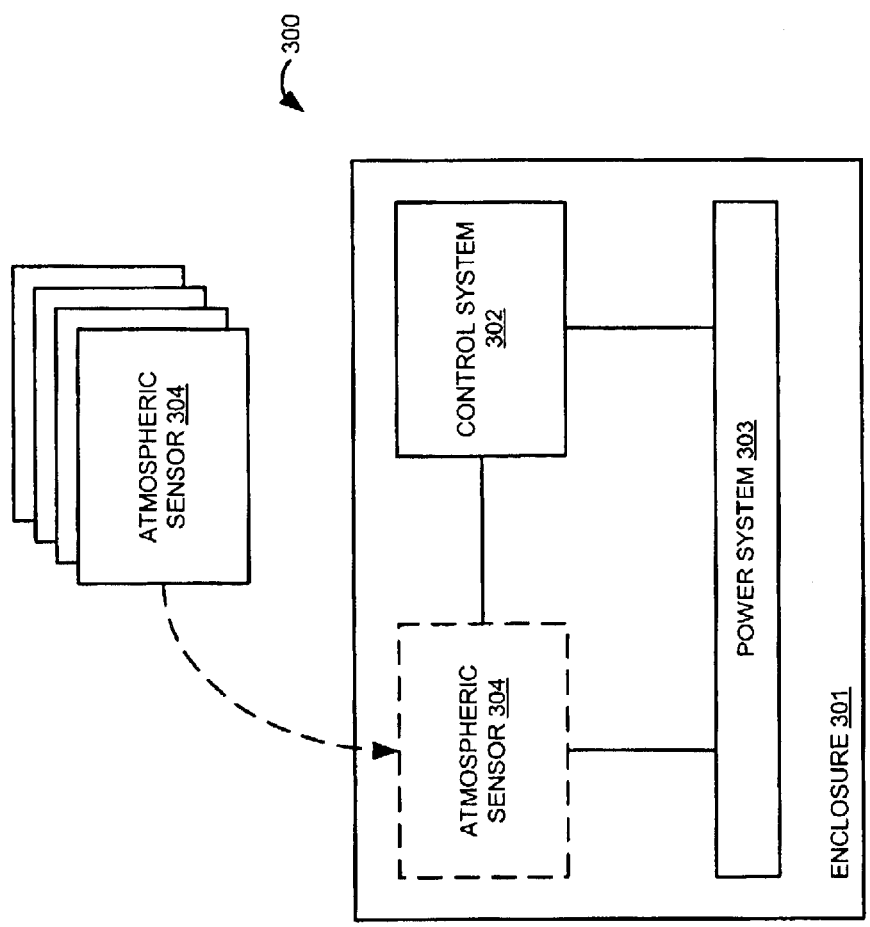
FIG. 3 illustrates an atmospheric data measurement system in an example of the invention.

FIG. 3 illustrates atmospheric data measurement system 300 in an example of the invention. Atmospheric data measurement system 300 includes enclosure 301 which houses control system 302 and power system 303. Enclosure 301 could be similar to those described above. Control system 302 receives data indicating an atmospheric parameter from atmospheric sensor 304. Control system 302 stores and transfers the data. Control system 302 could perform in a similar fashion to the personal digital assistants described above, and in some variations, control system 302 could be a personal digital assistant. Power system 302 provides power to control system 302 and atmospheric sensor 304 when control system 302 and sensor 304 are properly installed within enclosure 301. Power system 303 could be similar to those described above.

Control system 302 is configured for removable coupling to any one of a group of different atmospheric sensors. These atmospheric sensors could be similar to those described above. The dotted arrow indicates that atmospheric sensor 304 is selected from the group and connected to control system 302 by the removable coupling. In the context of the invention, the term "removable coupling" means a connection that can transfer data, that that can be readily and securely attached by hand, and that can be readily removed by hand. A few examples of a removable coupling include a cable with plugs or male/female data terminals on control system 302 and atmospheric sensor 304.

Figure 4:
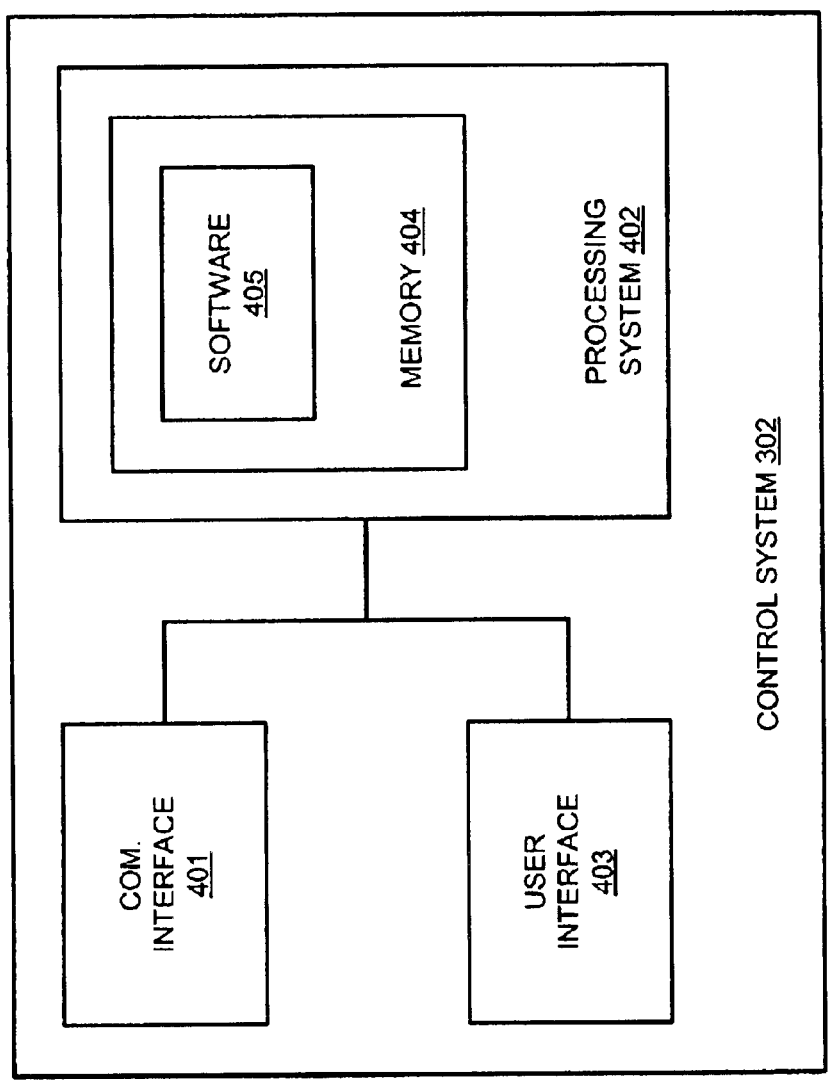
FIG. 4 illustrates a control system for an atmospheric data measurement system in an example of the invention.

FIG. 4 illustrates control system 302 for atmospheric data measurement system 300 in an example of the invention. Control system 302 includes communication interface 401, processing system 402, and user interface 403. Processing system 402 includes memory 404. Memory 404 stores software 405. Processing system 402 is linked to communication interface 401 and user interface 403.

Control system 302 could be comprised of programmed general-purpose computer circuitry and equipment, although those skilled in the art will appreciate that programmable or special purpose circuitry and equipment may be used. Communication interface 401 could comprise a network interface, data port, RS-232 port, universal serial bus port, infra-red communicator, wireless communication interface, and/or some other communication device. Processing system 402 could comprise a computer microprocessor, logic circuit, and/or some other processing device. Processing system 402 may be distributed among multiple processing devices. User interface 403 could comprise a voice recognition interface, speaker, graphical display, touch screen, control buttons, and/or some other type of user control device. Memory 404 could comprise a disk, integrated circuit, and/or some other memory device. Memory 404 may be distributed among multiple memory devices.

Processing system 402 retrieves and executes software 405 from memory 404. Software 405 may comprise an operating system, utilities, drivers, and networking software. Software 405 could comprise a computer program, firmware, logic circuitry, integrated circuitry, or some other form of machine-readable processing instructions. When executed by processing system 402, software 405 directs processing system 402 in a similar fashion to the application software described above that directs the personal digital assistants.

What is claimed is:

1. An atmospheric data measurement system comprising:
    an atmospheric sensor configured to measure an atmospheric parameter and generate data indicating the atmospheric parameter;
    a personal digital assistant configured to receive, store, and transfer the data;
    a link configured to transfer the data from the atmospheric sensor to the personal digital assistant;
    a power system configured to provide power to the atmospheric sensor and the personal digital assistant;
    an enclosure configured to house the atmospheric sensor, the personal digital assistant, the link, and the power system; and
    a transport mechanism configured to transport the enclosure to an altitude.

2. The atmospheric data measurement system of claim 1 with the transport mechanism further-comprising a tethered balloon configured to transport the enclosure to an altitude.

3. The atmospheric data measurement system of claim 1 wherein the atmospheric parameter comprises one of carbon dioxide, carbon monoxide, hydrocarbons, water vapor, ozone, nitrous oxide, and methane.

4. The atmospheric data measurement system of claim 1 wherein the atmospheric parameter comprises one of temperature, pressure, humidity, wind, and solar radiation.

5. The atmospheric data measurement system of claim 1 wherein the personal digital assistant is configured to control operation of the atmospheric sensor.

6. The atmospheric data measurement system of claim 1 wherein the personal digital assistant is configure to correlate the data for individual atmospheric samples with individual times of measurement of the individual atmospheric samples.

7. The atmospheric data measurement system of claim 1 wherein the personal digital assistant is configured to correlate the data for individual atmospheric samples with individual geographic locations of measurement of the individual atmospheric samples.

8. The atmospheric data measurement system of claim 1 wherein the personal digital assistant is configured to transfer the data using wireless communications when the enclosure is being transported.

9. The atmospheric data measurement system of claim 1 wherein the enclosure is transported to various altitudes and the personal digital assistant is configured to control the altitudes using wireless communications.

10. The atmospheric data measurement system of claim 1 further comprising:
    a pump configured to transfer atmospheric air to the atmospheric sensor, and wherein the power system is configured to provide power to the pump; and the enclosure is configured to house the pump.

11. The atmospheric data measurement system of claim 10 wherein the personal digital assistant is configured to control operation of the pump.

12. The atmospheric data measurement system of claim 1 wherein the enclosure is configured to allow a display on the personal digital assistant to be visible when the personal digital assistant is in the enclosure.

13. A method of operating an atmospheric data measurement system, the method comprising:

housing an atmospheric sensor and a personal digital assistant in an enclosure;

transporting the enclosure to an altitude using a transport mechanism;

in the atmospheric sensor that is in the enclosure at the altitude, measuring an atmospheric parameter and generating data indicating the atmospheric parameter;

in the personal digital assistant that is in the enclosure at the altitude, receiving and storing the data; and transferring the data from the personal digital assistant.

14. The method of claim 13 wherein transporting the enclosure to the altitude using a transport mechanism comprises using a tethered balloon.

15. The method of claim 13 wherein the atmospheric parameter comprises one of carbon dioxide, carbon monoxide, hydrocarbons, water vapor, ozone, nitrous oxide, and methane.

16. The method of claim 13 wherein the atmospheric parameter comprises one of temperature, pressure, humidity, wind, and solar radiation.

17. The method of claim 13 further comprising, in the personal digital assistant that is in the enclosure at the altitude, controlling operation of the atmospheric sensor.

18. The method of claim 13 further comprising, in the personal digital assistant that is in the enclosure at the altitude, correlating the data for individual atmospheric samples with individual times of measurement of the individual atmospheric samples.

19. The method of claim 13 further comprising, in the personal digital assistant that is in the enclosure at the altitude, correlating the data for individual atmospheric samples with individual geographic locations of measurement of the individual atmospheric samples.

20. The method of claim 13 wherein transferring the data from the personal digital assistant comprises transferring the data using wireless communications from the personal digital assistant that is in the enclosure at the altitude.

21. The method of claim 13 wherein transporting the enclosure to the altitude comprises, in the personal digital assistant, controlling the altitude using wireless communications.

22. The method of claim 13 further comprising:

housing a pump in the enclosure; and in the pump that is in the enclosure at the altitude, pumping atmospheric air to the atmospheric sensor.

23. The method of claim 22 further comprising, in the personal digital assistant that is in the enclosure at the altitude, controlling operation of the pump.

24. A software product for an atmospheric data measurement system that includes a personal digital assistant, an atmospheric sensor to measure an atmospheric parameter and generate data indicating the atmospheric parameter, and a transport mechanism to transport the personal digital assistant and the atmospheric sensor to an altitude, the software product comprising:

application software configured to direct the personal digital assistant to receive the data indicating the atmospheric parameter, store the data, transfer the data, and control operation of the atmospheric sensor; and a memory that stores the application software.

25. The software product of claim 24 wherein the atmospheric data measurement system includes a pump to transfer atmospheric air to the atmospheric sensor and wherein the application software is configured to direct the personal digital assistant to control operation of the pump.

26. The software product of claim 24 wherein the application software is configured to direct the personal digital assistant to correlate the data for individual atmospheric samples with individual times of measurement of the individual atmospheric samples.

27. The software product of claim 24 wherein the application software is configured to direct the personal digital assistant to correlate the data for individual atmospheric samples with individual geographic locations of the individual atmospheric samples.

28. The software product of claim 24 wherein the application software is configured to direct the personal digital assistant to transfer the data using wireless communications when the enclosure is being transported.

29. The software product of claim 24 wherein the atmospheric data measurement system is transported to various altitudes and the application software is configured to direct the personal digital assistant to control the altitudes using wireless communications.

30. The software product of claim 24 wherein the atmospheric parameter comprises one of the carbon dioxide, carbon monoxide, hydrocarbons, water vapor, ozone, nitrous oxide, and methane.

31. The software product of claim 24 wherein the atmospheric parameter comprises one of temperature, pressure, humidity, wind, and solar radiation.

32. An atmospheric data measurement system comprising:

a control system that is configured for removable coupling to any of a plurality of different atmospheric sensors and that is configured to receive data indicating an atmospheric parameter from a coupled one of the atmospheric sensors, store the data, and transfer the data;

a power system configured to provide power to the coupled one of the atmospheric sensors and the control system;

an enclosure configured to house the coupled one of the atmospheric sensors, the control system, and the power system; and a transport mechanism configured to transport the enclosure to an altitude.

33. The atmospheric data measurement system of claim 32 with the transport mechanism further comprising a tethered balloon configured to transport the enclosure to an altitude.

34. The atmospheric data measurement system of claim 32 wherein the atmospheric parameter comprises one of carbon dioxide, carbon monoxide, hydrocarbons, water vapor, ozone, nitrous oxide, and methane.

35. The atmospheric data measurement system of claim 32 wherein the atmospheric parameter comprises one of temperature, pressure, humidity, wind, and solar radiation.

36. The atmospheric data measurement system of claim 32 wherein the control system is configured to control operation of the atmospheric sensor.

37. The atmospheric data measurement system of claim 32 wherein the control system is configured to correlate the data for individual atmospheric samples with individual times of measurement of the individual atmospheric samples.

38. The atmospheric data measurement system of claim 32 wherein the control system is configured to correlate the data for individual atmospheric samples with individual geographic locations of measurement of the individual atmospheric samples.

39. The atmospheric data measurement system of claim 32 wherein the control system is configured to transfer the data using wireless communications when the enclosure is being transported.

40. The atmospheric data measurement system of claim 32 wherein the enclosure is transported to various altitudes and the control system is configured to control the altitudes using wireless communications.

41. The atmospheric data measurement system of claim 32 wherein the control system comprises a personal digital assistant.

\* \* \* \* \*